United States Patent [19]

Brenner

[11] 4,352,616
[45] Oct. 5, 1982

[54] DEVICE FOR ARRANGING OBJECTS IN STACKING LAYERS, FOR LOADING PALLETS

[75] Inventor: Hermann Brenner, Kunzelsau-Kocherstetten, Fed. Rep. of Germany

[73] Assignee: Grossbuchbinderei Sigloch GmbH & Co. KG, Kunzelsau, Fed. Rep. of Germany

[21] Appl. No.: 127,647

[22] Filed: Mar. 6, 1980

[30] Foreign Application Priority Data

Dec. 28, 1979 [DE] Fed. Rep. of Germany ....... 2952624

[51] Int. Cl.$^3$ ............................................. B65G 57/26
[52] U.S. Cl. ..................................... 414/31; 198/374; 198/434; 414/52; 414/60; 414/63; 414/68; 414/84; 414/786
[58] Field of Search ....................... 414/31, 52, 57, 60, 414/62, 63, 68, 80, 82, 84, 786; 198/374, 375, 412, 414, 434

[56] References Cited

U.S. PATENT DOCUMENTS

| 2,769,558 | 11/1956 | Ehlers | 198/374 X |
| 2,997,187 | 8/1961 | Burt | 198/412 X |
| 3,176,858 | 4/1965 | Johnson | 414/84 |
| 3,776,404 | 12/1973 | Anastasio et al. | 414/31 X |
| 3,901,391 | 8/1975 | Carlson et al. | 414/62 |
| 3,902,609 | 9/1975 | Ohlsson | 414/31 X |
| 4,063,632 | 12/1977 | Neth et al. | 198/374 |
| 4,255,074 | 3/1981 | Meratti et al. | 414/62 |

FOREIGN PATENT DOCUMENTS 2432579 1/1976 Fed. Rep. of Germany ........ 414/31

Primary Examiner—Leslie J. Paperner
Attorney, Agent, or Firm—Shlesinger, Arkwright, Garvey & Dinsmore

[57] ABSTRACT

A method and apparatus for grouping of objects such as books or the like to stacking layers for loading onto pallets wherein stacks of equal height are formed from the individual objects, and are conveyed sequentially for forming a stacking row, the length of which corresponds to the transverse dimension of a pallet; at least one of the stacks in a given stacking row is rotated by 90° with respect to the other stacks in the given stacking row, and a gap is produced between the thusly rotated stack and the remainder of the stacks in the stacking row, the stacking row then being pushed onto an intermediate storage table, with subsequently arriving similarly oriented stacking rows being pushed onto the first stacking row to form a tier, and subsequent tiers similarly formed but with differently oriented stacks to provide a staggered or overlapping bond and thus a stable pallet stack.

21 Claims, 8 Drawing Figures

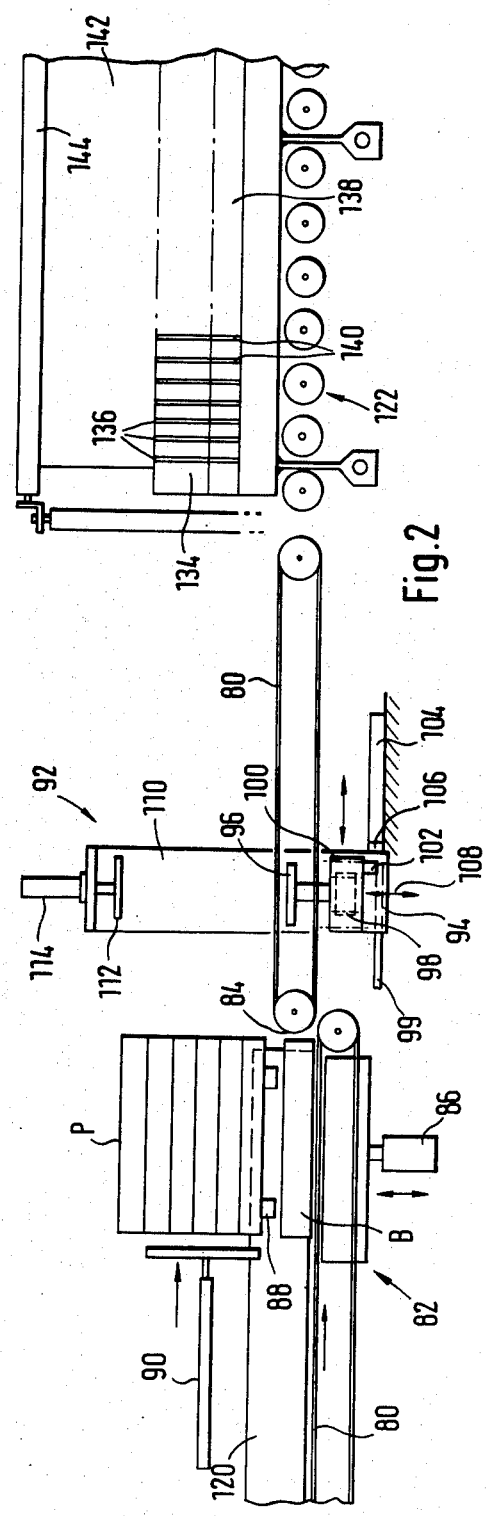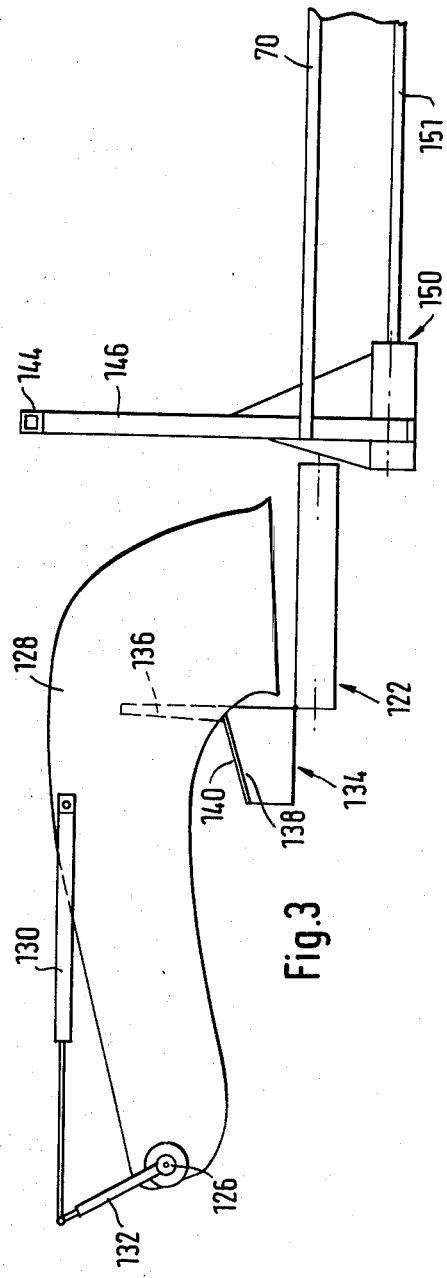
Fig.2
Fig.3

DEVICE FOR ARRANGING OBJECTS IN STACKING LAYERS, FOR LOADING PALLETS

This invention relates to a process and a device for mechanical arranging of objects which are to be stacked, in particular books, packs or blocks of books, or filled packages of similar dimensions, into stacking layers for loading on pallets, factory trucks, or rolling cars.

In internal traffic, for example involving books from a binding-and-drying press or from a machine which wraps on a protective covering, or cartons which are filled and closed and are discharged from automatic packaging machinery, these objects must be picked up and stored, sometimes temporarily between operations, and the manual strength of the operator of the machinery is often not sufficient for this, whence additional personnel are needed. These tasks are strenuous and relatively monotonous. The employment of mechanical aids, such as known types of roller conveyors, which would convey an object being discharged from the machine to a storage location, is not possible if the objects must be carefully stacked in the largest or highest possible, space-saving stacks, which are required to be transportable within the plant on pallets or factory trucks, or which must be packaged as shippable assemblies.

Accordingly, the problem underlying the present invention is to devise a process, and an apparatus for carrying out the process, to automatically order and arrange objects which are leaving a processing or packaging machine in sequence, into stacking layers, such that stable, transportable stacks on pallets are produced from multiple stacking layers stacked vertically.

With regard to the process this problem is solved according to the invention by first forming stacks of equal height from the objects which are delivered individually into the same location, and with the same orientation, and are lying flat; i.e., by then passing the stacks along an accumulation stretch to form a row of stacks with the length of the row corresponding to the transverse dimension of a pallet; by rotating at least one stack 90° relative to the other stacks in the same row of stacks, during the conveying of the separate stacks, and setting up a gap between differently rotated stacks of a row of stacks; by pushing a row of stacks transversely to the row direction onto an intermediate storage table, and completing the first stack layer in the dimensions of the pallet from subsequent stack pushed sequentially after the first one onto said table, and then transferring the layer of stacks from the intermediate storage table to a pallet; and by rotating the stacks in forming the stack rows for the next stacking layers in a different sequence relative to the preceding stacking layer, such that the vertically stacked stacking layers on the pallet are at least partially staggered or are in a bond. [i.e. overlapping].

Such a process offers the possibility of automatic machine ordering or arranging of objects of equal size into stacking layers which are stacked such that succeeding stacking layers stacked on top are braced against each other in a fashion similar to that of bricks in a brick wall which are in a "bond" which so that the overall stack which is built up on a pallet or factory truck has high internal stability and can be transported safely as a whole. The proposed process can be carried out completely automatically, without the use of human labor, and with high numerical feed rate for the objects which are being handled.

Expediently at least the second and following stacking layers are transferred from the intermediate storage table to a stacking release plate which is height-adjustable over the pallet, and which is pulled away under the stacking layer, which, meanwhile rests against an approximately vertical side contact surface.

The process, can be carried out such that fewer stacking rows are shifted onto the intermediate storage table than needed to form a stacking layer, and such that the intermediate storage table is emptied toward the stacking release plate as many times as needed to fill up a stacking layer corresponding to the size and shape of the pallet. If, however, the stacking release plate must pass through timewise fairly long excursions in depositing a stacking layer on the pallet or on the previous stacking layer and then returning to the level of the intermediate storage table, then additional stacking rows can be stored on the intermediate storage table, representing successive stacking layers, in which case the correspondingly larger-dimensional intermediate storage table is emptied only partly each time, i.e. to the extent of the length of a complete stacking layer.

In arranging or grouping books with rounded backs, it is of practical value to rotate individually supplied books by 90° in opposite directions when forming a stack, and to so place one on top of the other that each book back in a stack is outside the free book cover edges of the books above and below. This measure is also useful for increasing the stability of the entire stack, since each book is basically thicker in some degree at the back than at the open side, and without the crossed arrangement books lying flush on top of each other would form a partial stack which would have a surface inclined upward at the back side of the books.

A device for arranging objects which are to be stacked into groupings for carrying out the above described process, is characterized according to the invention by a longitudinal transport mechanism which works in conjunction with a stacking station for stacks of equal height which are to be periodically formed from objects which are aligned with respect to each other, and also works in combination with a subsequently operating device for selectively rotating a stack by 90°; further by an accumulating roller conveyor subsequent to said transport mechanism which has deflectors which are movable in the conveying path for forming a row of stacks comprised of longitudinally and transversely oriented stacks; further by a partial sliding mechanism for moving a row of stacks sideways onto a region of an intermediate storage table near an accumulating roller conveyor, which table is located in front of a pallet or stacking release plate which is movable and is of the same height; still further, by a push off panel for moving a stacking group containing one or more stacking rows, or a complete stacking layer, from the intermediate storage table to the pallet or stacking release plate; and by a programmed control mechanism for actuating a stacking rotation mechanism, whereby the stacks of stacking groups which are vertically stacked on the pallet are staggered or overlapped. An advantage of this device is that during the initial formation of stacks of the incoming objects destined for the subsequent section of the device there are sufficiently large cycle times to carry out additional common manipulations of a large number of objects, or to actuate auxiliary devices, which then can return to their final position. The program control mechanism is set once for a given quantity of objects, whereby all the operations which may vary over a sequence of stacking layers, and be repeated in any order, will be performed automatically.

To produce a cross orientation of books having stiffened book backs, within a partial stack, a device can be provided, in front of the stacking station, for rotating the individually conveyed books by 90° to either side, so that the books in a given stack alternate in positions rotated at more than 180° with respect to each other. In one embodiment, the rotating mechanisms may comprise vertical deflector rods which are selectively moveable between conveyor belts in the transport path, such that a object or stack comes against them off center and is further guided against side guide panels to complete the rotation operation.

With another, faster operating embodiment, at least the packs rotating mechanism comprises a turntable located between conveyor belts or roller conveyors, which turntable rides on a driven sliding carriage guided in the transport direction, and is raiseable during the duration of its longitudinal and rotational movement away from the transport level, against a rotatably pivoted detent disc located above it at a distance, for moving the book or stack which is to be rotated, under tension, above the transport level; whereby the rotation of the detent disc is accomplished on a bracket attached to the sliding carriage.

A particularly simple and naturally successful drive is realized by having a gear mounted on the shaft of the turntable which engages a drive shaft bearing an eccentric pin which is guided over a switchable routing means selectively into curved paths fixed with respect to the movement of the sliding carriage, whereby the drive disc and turntable may be rotated to the left or to the right by 90°.

According to an important feature of the device, there are deflectors on the side of the accumulating roller conveyor which act as maintainers of separation between neighboring stacks in a row of stacks, which deflectors are movable, under the control of the programmed control mechanism, in the conveying path of differently rotated stacks, and are adjustable in their respective separation-maintaining positions along the accumulating roller conveyor. It is of practical value to produce a separation between differently rotated partial stacks, since in this way, in the transverse sliding of the rows of stacks and the relative shifting which may result between objects which are differently rotated relative to each other, which relative shifting results from said transverse sliding, any contact of neighboring partial stacks is avoided, thus reliably avoiding any tilting which might occur.

The deflectors can be obstacle fingers, for example, comprised of the free ends of the piston rods or plungers of pneumatic cylinders, which are adjustable on a guide rail positioned on the side next to the accumulating roller conveyor. Alternatively, the deflectors may each comprise a separating plate which is swingable in the conveying path, is pivoted on an axle located near the roller conveyor, has its swinging motion driven pneumatically, and has an adjustable length.

The partial sliding mechanism preferably comprises a vertical pushing panel which extends over the storage segment of the accumulating roller conveyor and in the vertical direction, over the height of the row of stacks which rests on the accumulating conveyor, which pushing panel is pushed at the appropriate time transversely to the accumulating roller conveyor in the direction of the intermediate storage table, after a completion of a row of stacks. This pushing panel may contain multiple vertical slots which open upward, at certain of which slots the separating bars are set along the accumulating roller conveyor, and in which slots the separating plates are guided in the swung-in, activated state during the movement of the pushing panel. Due to this feature the control of the swinging movement of the separating plates does not need to be adjusted to the movement of the pushing panel, and does not need to be precisely adjusted to the arrival of subsequent partial stacks on the accumulating roller conveyor. If, for example, for completion of a stacking layer the last stacking row comprises only a partial row, a separating plate can be swung in if the pushing panel is near the intermediate storage table. When the programmed partial stack moves up on the accumulating roller conveyor, immediately the deflector is positioned at the required spot in the conveying path, hence the rate of feed or cycling can be increased readily. Expeditiously the pushoff panel which runs above the intermediate storage table parallel to the accumulating roller conveyor is kept adjustable as to height at both ends, by means of vertical pneumatic cylinders which are attached to a sliding carriage underneath the intermediate storage table, which carriage is guided in the same direction as the partial sliding mechanism, and is driven by a horizontal feed cylinder. This pushoff panel is preferably connected to the piston rods of the pneumatic cylinders on both sides, with swing axes perpendicular to the plane of its extent and having sideways play in that plane, so that the pushoff panel can be tilted without bending the piston rods.

In a further refinement of the device the deflectors which are movable in the conveying panel may be positioned above the accumulating roller conveyor, while on each of the two sides of the accumulating roller conveyor an intermediate storage table with a pushoff wall is provided, and the partial sliding mechanism is alternately driven from one side to the other of the accumulating roller conveyor, in order to alternately transfer a row of stacks to another stacking table. Such an arrangement is advantageous, for example, if the objects to be stacked are fed at a high numerical feed rate and the stacking release plate for depositing the stacking layers on the pallet or the like has a long return path.

DESCRIPTION OF THE DRAWINGS

An example embodiment of the invention is illustrated in more detail in the following description, in connection with the drawings, in which:

FIG. 2 is a schematic side view of the device of FIG. 1, and viewed in the direction of arrow II;

FIG. 3 is a cross section along lines III—III of FIG. 1 and viewed in the direction of the arrows;

DESCRIPTION OF THE INVENTION

Figure 5:
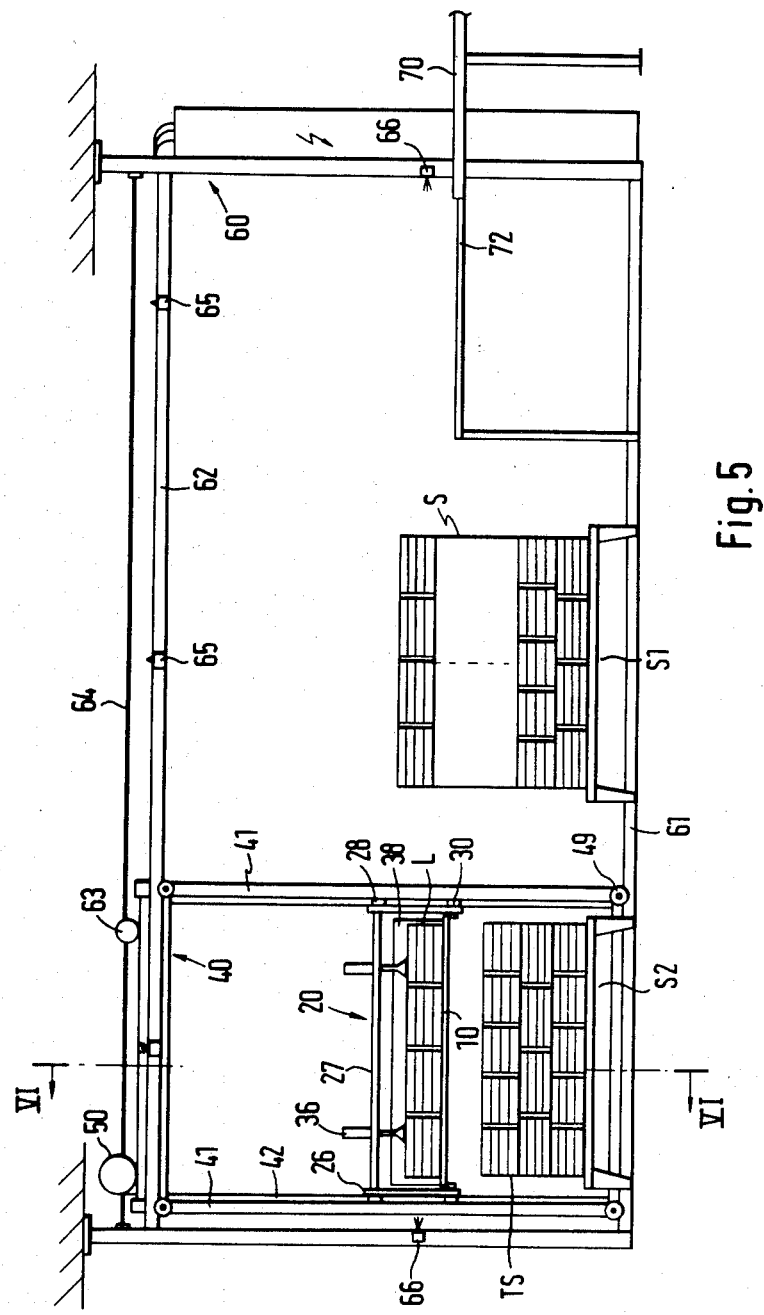
FIG. 5 is a schematic view of a stacking device with a stacking release plate connectable to the intermediate storage table.
Figure 6:
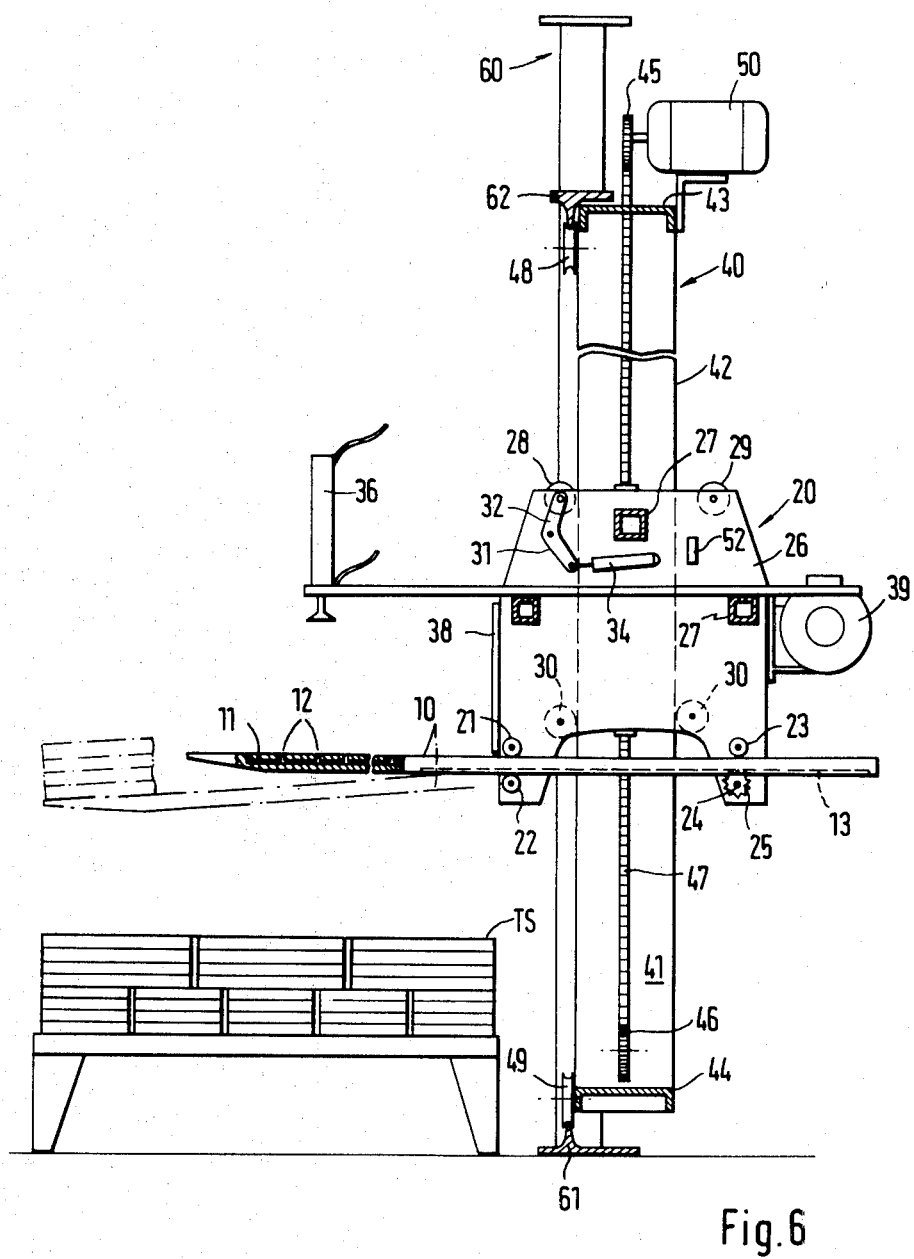
FIG. 6 is a cross section viewed along line VI—VI in FIG. 5 and viewed in the direction of the arrows.

With respect to FIGS. 5 and 6, a stacking release device has a vertical main frame 60 which forms a longitudinal conveying stretch the length of which depends on the number of pallets S1, S2, and so on which are to be loaded. A traveling frame 40 is guided on upper and lower rails 62 and 61 which traveling frame may be moved between intermediate storage table 70 shown on the right in FIG. 5, and at least one stacking station located on the longitudinal conveying stretch.

An upper horizontal chain is stretched over the main frame 60, which chain acts as a track for a pinion located on the shaft of a drive motor on the traveling frame. Traveling frame 40 comprises vertical frame pieces 41 with guide rails for a lift frame 20, and further comprises top and bottom bracing transverse frame pieces 43 and 44. On the vertical frame pieces, chains 47 are passed over upper and lower chain wheels 45 and 46, with the lift frame being suspended on said chains.

Lift frame 20 comprises two side walls 26 which are separated and braced opposite each other by horizontal tubular shapes 27. Top and bottom roller pairs 28, 29, and 30 are pivotably mounted on the outer side of the side walls opposite each other, with the lift frame being guided by said rollers, on vertical guide rails 42 of the traveling frame 40. A stacking release plate 10 is located between sides 26 of the lift frame 20, is guided by rollers 21 and 22 which press against its top and bottom, and bears at least one downward facing toothed rack on its underside which is engaged by pinion 25 which is mounted on horizontal shaft 24 which in turn is rotatably mounted on the lift frame and is driven by a servo motor.

Stacking release plate 10 is moved out from one side of the lift frame in a sidewise direction with the aid of the servo motor, whereby a stacking layer is picked up, transported until it is above the pallet, and set down, for which the stacking release plate is retracted under a pushing side surface 38 which is attached to the lift frame. Compressed air distribution system 11 is disposed beneath flat top side of stacking release plate 10; this system has nozzles which open upward.

In the extended position the stacking release plate 10 inclines slightly at a small angle (represented in exaggerated form in FIG. 6). For this purpose lower the roller pair 30 lies directly against vertical guide rails 42 for the vertical guiding of the lift frame, while the upper rollers 28 and 29 are further from the guide rails, so that the lift frame tips, [automatically], in the direction of the extended stacking release plate, and due to the weight shift when the release plate is extended. This tipping is determined by the distance of upper roller 29 from the guide rail. In the extended position, the stacking release plate rests in the take-up position on a support 72 on the intermediate storage table (FIG. 5). In this state the stacking layers are slid onto the stacking release plate, during which process the air nozzles facilitate the sliding motion.

After the loading of the stacking release plate the lift frame 20 is raised and moved sideways into the stacking station over the pallet which is to be loaded. Due to the hanging suspension of lift frame 20 the stacking release plate has its front end tilted downward, so that the front end approaches a pallet or the partial stack, first, for support. With continuing lowering motion of the lift frame the latter is swung within the play of its suspension, whereby a microswitch 52 is tripped, stopping the lifting motor at the point where the stacking release plate is supported basically on its front third by the pallet or partial stack. A sequential switch released by this process causes the stacking release plate to be retracted under the pushing side surface 38 by the servo motor, so that the stacking layer is maintained in place.

In order to maintain the desired tilted position of stacking release plate 10 during the entire return pneumatic cylinder 34 is supported on the lift frame and presses roller 29 which is rotatably mounted on an angle lever, in the direction of the vertical guide rail 42, thus temporarily eliminating the guide play between the upper guide rollers 28 and 29, so that the lift frame 20 cannot tip backwards when the weight of a stacking release plate is increasingly shifted to the rear. The operating play has ended by the time the stacking release plate is extended under the stacking layer, and the traveling frame 40 is returned to its initial position or into the loading position, and the lift frame 20 is returned to the loading height, whereupon stacking release plate 10 is driven forward again.

Figure 1:
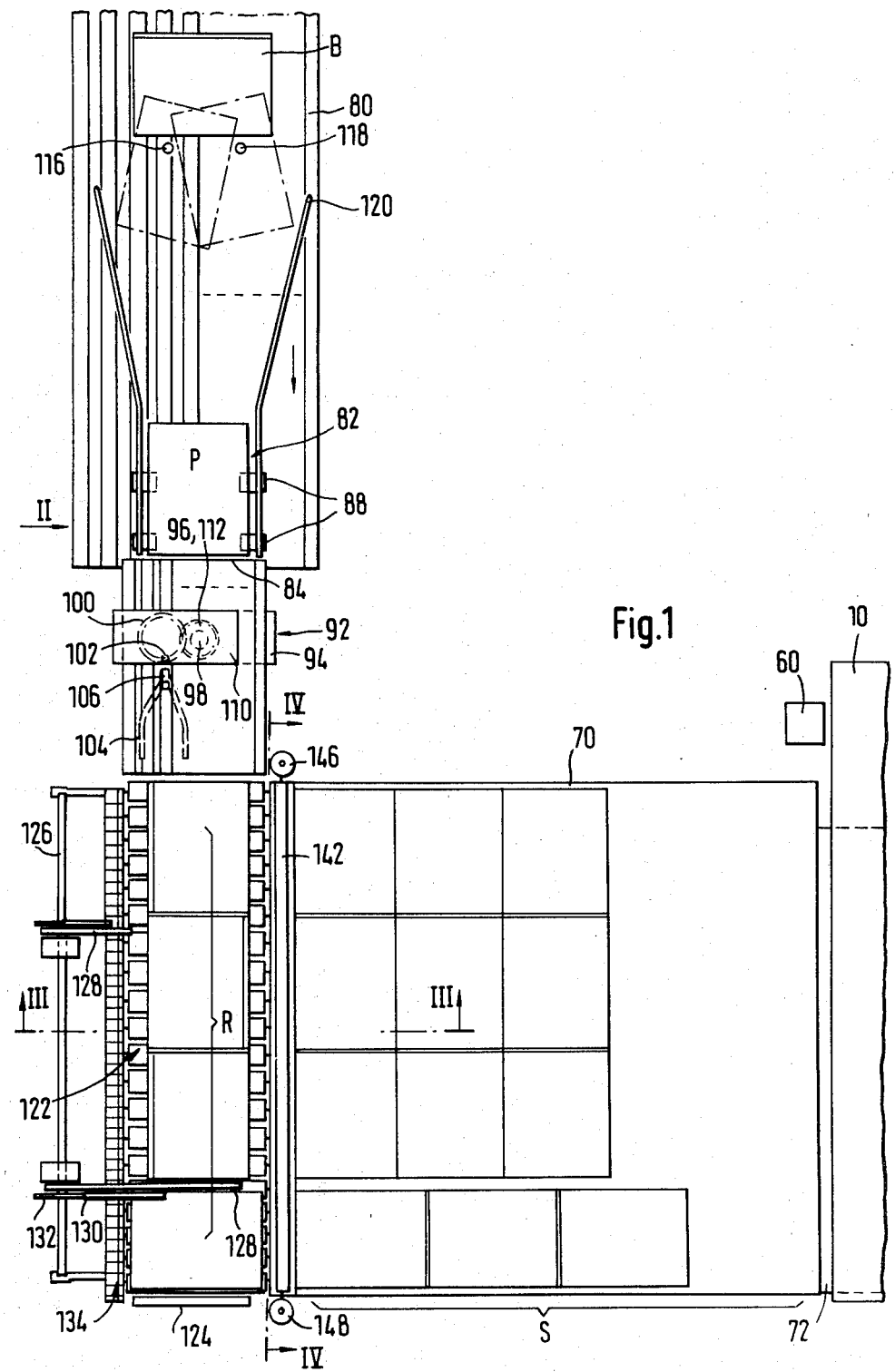
FIG. 1 is a schematic top view of a device for grouping objects into stacking layers for loading pallets, according to the invention.

As seen in FIGS. 1 and 2, the intermediate storage table 70 is the last segment of the grouping device. This table is located downstream of stack release mechanism at the loading height of stacking release plate 10. On the stacking release plate stacking layers of equal sized objects are developed which have a definite, predetermined arrangement. Although any desired objects may be ordered, arranged, and stacked, for the sake of simplicity in the following description, the stacking of books will be referred to especially. The books P are delivered from a processing or packaging machine in the same position i.e. in similar locations and orientations, on a longitudinal transport mechanism 80, which may comprise multiple conveyor belts side by side which are guided over drive rollers and idler rollers. In the path of the longitudinal transport mechanism 80 there is a stacking station 82 for stacks of books which are aligned with respect to each other, which stacks are periodically formed and are of equal height. The stacking station 82 comprises an end detent 84, a lifting mechanism 86 which is disposed between the conveyor belts, in order to lift each book which presses against detent 84, to a set height above a hold-back support 88, and a pushoff mechanism 90 for transferring the partial stacks formed at the stacking station 82 to a subsequent region of the longitudinal transport mechanism 80. Instead of the pushoff mechanism 90, the hold-back support 88 may be so designed that it releases the partial stack with a set number of books, from the underside, for further conveying.

In the subsequent conveying path of the partial stacks there is a rotating mechanism 92, comprising a sliding carriage 94 movable back and forth in the conveying direction, a turntable 96 rotatably mounted on the sliding carriage so as to rotate around a vertical axis, and a pinion 98 mounted on the shaft of the turntable 96. The pinion engages drive wheel 100 which is also rotatably mounted on sliding carriage 94 and bears eccentric pin 102. Pin 102 extends out into a fixed, two-arm guideway 104 at the fork of which there is a shiftable routing means 106. The turntable 96 may be driven above the level of the longitudinal transport mechanism by a lifting mechanism 108 in order to raise a stack of books on said turntable and press it against a detent disc 112 located at a distance above it and rotatably mounted on a bracket 110 which is attached in the sliding carriage 94. The rotatable disc 112 is movable, for automatic compression to hold the objects by pneumatic cylinder 114, whereby it moves in the direction of the turntable at the same time the turntable is being driven upward.

Depending on whether the partial stack is to be rotated 90° in the clockwise or counter-clockwise direction, the routing means 106 is shifted in one direction or the other so that with the controlled back and forth movement of the sliding carriage 94 in the conveying direction the eccentric pin 102 enters one of the two guide-ways, whereby the drive wheel 100 rotates in one direction or the other and thus turntable 96 with the partial stack is also rotated. At the end of the lengthwise stroke of the sliding carriage 94 the tensioning cylinders 108 and 114 are pressurized in the opposite direction, so that the rotated partial stack is again placed on the conveyor belt. Turntable 96 is return-rotated by eccentric pin 102 and returns along with sliding carriage 94 to the initial position.

The use of the above-described stack rotating mechanism 92 is of practical value in cases when the books within the partial stack have the same orientation or when all the book backs are superimposed. In order to protect the books within each stacking layer and within the entire stack it is expedient to bring the back sides or spines of the books to the outer side of the stacking layer. This outer side can be either the leading or trailing side of the partial stack. Since books with stiff backs are thicker on the back side of the book, it is advantageous, in order to avoid unevenness within the stacking layer, for the books to be alternately arranged at 180° to each other within the partial stack. For this purpose an additional rotating mechanism can be provided in front of stacking station 82, said mechanism comprising, in accordance with FIG. 1, selectively movable vertical detent rods 116 and 118 between the conveyor belts in the transport path, whereby the book approaches the rods eccentrically and is further guided by guide walls 120 which gradually narrow, such guiding continuing until the rotation is completed. In this case the above-described rotation mechanism 92 which follows stacking station 82 is still necessary. In order to be able optionally to either let the partial stack pass in the longitudinal direction without rotation or to rotate it 90° in one of the two rotational direction so that the partial stack lies perpendicular to the conveying direction. The rotating mechanism disposed ahead of stacking station 82 may be another automatic rotating mechanism with turntable on the bottom and detent disc on the top as described above, instead of the vertical detent rods 116 and 118 which are movable in the transport path. Likewise, rotating mechanism 92 following stacking station 82 can be replaced by one or two vertical detent rods, around which the partial stacks will be rotated. Such a simplified arrangement, however, requires longer rotation and cycling times.

In accordance with FIG. 1 there is an accumulating roller conveyor 122 following the longitudinal transport mechanism 80, which mechanism may be interrupted at stacking station 82. Conveyor 122 is located beyond stack rotating mechanism 92. The longitudinal transport mechanism 80 and the accumulating roller conveyor 122 have a width corresponding to at least the largest dimension of the objects or books which are to be arranged, but necessarily still wider where rotating mechanisms comprising detent rods, as at 116 and 118, are used, which rods are supplemented by guide panels on the sides which converge in the direction of advance, as at 120. The length of the accumulating roller conveyor 122, which conveyor is provided with a fixed detent 124 at its end, corresponds approximately to the shorter dimension of the intermediate storage table 70 which adjoins the accumulating roller conveyor on one of its longitudinal sides, or to the shorter dimension of a pallet S1 or S2 (FIG. 5), which pallet measures 800 mm by 1200 mm, according to a European standard.

A longitudinal supporting rail 126 is attached to the device frame on the side of accumulating roller conveyor 122 opposite the intermediate storage table 70. Several detents which are movable in the conveying path above the roller conveyor 122 are mounted on rail 126 and are positionable at longitudinal positions. These detents may have the form of pneumatic cylinders the free rod ends of which extend into the conveying path of the partial stack above the roller conveyor, when they are extended, and said detents in the example shown comprise separating plates 128 which are swingable around supporting rail 126, and are each actuated by a pneumatic cylinder 130, according to FIG. 3, which cylinder is swingably mounted on the end to the separating plate and on the other end to a lever 132 attached to supporting rail 126.

Roller conveyor 122 is bounded on the side of the support rail 126 by a pushing panel 134 of a partial sliding mechanism which extends over the length of the roller conveyor and is guided on the device frame transversely to the roller conveyor. This mechanism is driven across the width of the roller conveyor by a pneumatic cylinder (not shown) for pushing a row of stacks assembled on the accumulating roller conveyor 122 from there onto the intermediate storage table 70. The shape of the separating plates 128 is designed to maintain the distance between different partial stack (which are rotated with respect to each other) over the entire height of the partial stack, particularly during the movement of pushing panel 134, when a relative motion between longitudinal and transverse oriented partial stacks might occur. Pushing panel 134 contains numerous slots 136 which are equidistant and which open upward; each separating plate is set above one of these slots, in accordance with the programmed control which is set before the start of the operation. In accordance with FIG. 3, pushing panel 134 bears a sloped cross-panel 138 on its back side, which has notches 140 on the top side of the cross-panels which are directed toward the vertical slots 136. When the pushing panel 134 is moved, separating plate 128 is first guided with its concave edge at the bottom of the associated slot 136 and is thereby raised until finally the underside of the separating plate is guided into the notch 140 in cross-panel 138, which notch forms the continuation of the slot. In the initial position of pushing panel 134, separating plate 128 which is guided in slot 136 is swung in, its cutting edge being directly above roller conveyor 122. This pushing panel (134 and 140), provided with guide slots 136 and guide notches 140 makes it possible in different operating steps of the programmed control for one or more separating plate to be swung into the conveying path at a time just before they are to perform their detent function. They are then available in the following operating step without requiring any additional time to be swung in, and without any necessity for precise timing with the arrival of subsequently arriving partial stacks on the accumulating roller conveyor.

Figure 4:
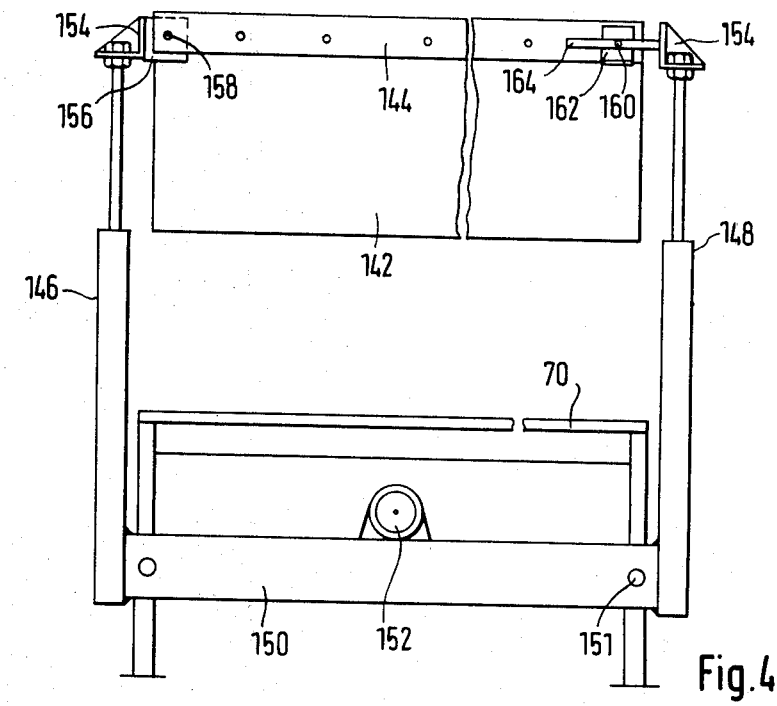
FIG. 4 is a partial representation showing the means by which the pushoff panel is held.

Above intermediate storage table 70 there is a pushoff wall 142 in accordance with FIG. 4, located right next to accumulating roller conveyor 122 and extending over the length of said conveyor. The movement stroke of pushing panel 134 of the partial sliding mechanism reaches past the junction region of the intermediate storage table 70, so that after the partial sliding mechanism retracts, pushoff wall 142 can be lowered down to intermediate storage table 70 in order to engage stacking row R which has been set there, or to engage completed stacking layer S, on the back side, and transfer it to stacking release plate 10. Pushoff wall 142 is attached at its top end to a U-beam 144 which opens downward and is connected to the free piston rod ends of two pneumatic cylinders 146 and 148. These two vertical cylinders are supported on a sliding carriage 150 which slides under the intermediate storage table 70, which carriage is movable by means of pneumatic cylinder 152 attached to the device frame, in the same direction as the partial sliding mechanism 134 but over a length corresponding to the longitudinal dimension of the stacking release plate 10 which is to be loaded. As mentioned above, the intermediate storage table 70 may be longer than the stacking release plate 10, in order to have more storage space available in the event a completed stacking layer cannot be moved away because the stacking release plate on the stacking release device according to FIGS. 5 and 6 has a longer path to go through and in the meantime new rows of stacks have arrived at the intermediate storage table. In this case the pushoff wall 142 and cylinder 152 have correspondingly greater lengths. As soon as stacking layer S is completed, the intermediate storage plate is moved by moving in vertical pneumatic cylinders 146 and 148, to approach intermediate storage table 70; meanwhile cylinder 152 is left to run free so that pushoff wall 142 can follow the subsequently deposited stacking rows R.

Angle shapes 154 are attached to the free piston rod ends of vertical pneumatic cylinders 146 and 148. Inwardly-projecting block 156 is mounted on the vertical side of one of the shapes in the open end of U-beam 144, and is swingably attached to said U-beam by a horizontal transverse pin 158. Another block 162 is attached inside the opposite end of U-beam 144 and is swingable around horizontal axle 160. This block 162 guides a rod 164 in a borehole running parallel to U-beam 144, and the rod 164 in turn extends from the vertical side of angle shape 154. This articulated assembly ensures free pivoting play, by means of the longitudinal guiding of rod 164 in the borehole of block 162, so that bending of the piston rods of pneumatic cylinders 146 and 148 is avoided if the movement of pushoff plate 142 is impeded on one side due to a nonaligned partial stack within stacking layer S and the pushoff plate tends to be tilted. Furthermore, the arrangement is so devised that the pneumatic cylinders 146 and 148 are completely retracted when pushoff plate 142 lies on intermediate storage table 70 or is immediately above it. In this way the piston rods are supported both on their pistons and on the cylinders themselves at the exit points of the rods from the cylinders, and are in position to assume the stresses which arise in sliding the stacking layer.

Figure 7A:
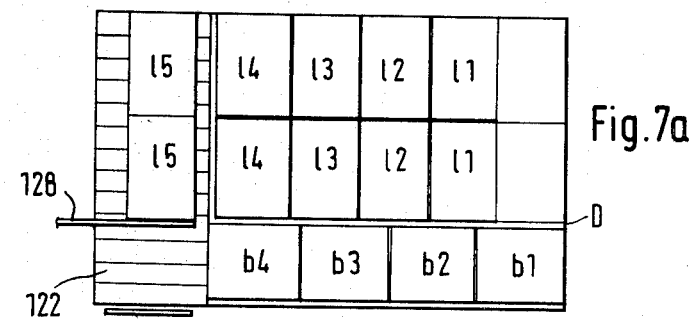
FIGS. 7a and 7b is a grouping example of two successive layers.
Figure 7B:
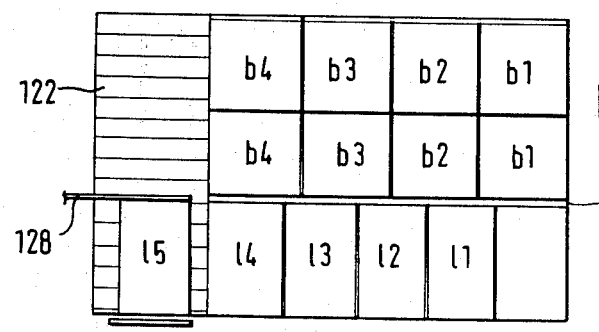

The programmed control (not shown) which carries out the operating steps of the arranging device receives its signals from photocells, microswitches, or electrical end detents, which are positioned in the path of the books, partial stacks, stacking rows, etc., and in the path of the operating mechanisms, so as to release preprogrammed output signals in response to the input signals produced by these sensing devices, whereby the various drive means are actuated. The starting basis for the programming is the size and shape of the objects books or blocks of books, which are to be stacked. Taking into account the dimensions of the pallet, the pallet surface according to FIGS. 7a and 7b is divided, for example, such that the maximum number of units can be accommodated on this surface, at the same time observing the necessary separation for avoiding tilting during relative shifting which may occur. In the relatively simply example of FIG. 7 the pallet surface is optimally employed if it contains a stacking layer according to FIG. 7a, with two rows of five partial stacks $l_1$ through $l_5$ turned in the longitudinal direction and one row of four partial stacks $b_1$ through $b_4$ turned in the transverse direction, and the next stacking layer, corresponding to FIG. 7b, contains two rows of four partial stacks $b_1$ through $b_4$ turned in the transverse direction and one row of five partial stacks $l_1$ through $l_5$ turned in the longitudinal direction. Obviously, other distributions are conceivable and possible with objects of the same size and shape but with larger separations. The stacking layers according to FIGS. 7a and 7b can be alternately formed and stacked within the total stack.

It is assumed in the following application example that the books being handled have a reinforced back and therefore are rotated at the rotating station ahead of stacking station 82 of FIG. 1 such that they alternate by 180° within each stack P. For books without reinforced backs, it is advisable, to protect the product, that the outermost partial stack in the stacking layers according to FIGS. 7a and 7b is placed so that the book backs face outward, namely the backs in the partial stacks $l_1$, $l_5$, and $b_1$ through $b_4$. In this case the stack-rotating device 92 of FIG. 1 must have two guideways as shown.

For producing the stacking layer of FIG. 7a, four stacking rows R are formed behind each other on accumulating roller conveyor 122, with partial stacks $b_1$, $l_1$, and $l_1$, whereby a separating plate 128 is swung in to produce the separation between the transversely turned stack $b_1$ and the two following longitudinally turned stacks $l_1$ and $l_1$. The thus formed stacking rows are transferred from the partial sliding mechanism 134 to the intermediate storage table 70. In the transfer of three following similar stacking rows, in each case a relative movement between the longitudinally directed and transversely directed partial stacks occurs, but no problems result due to the separation introduced between the rotated and non-rotated partial stacks by the separating plate. FIG. 7a shows the state in which the last stacking row for completing the stacking layer on the intermediate storage table 70 contains only two non-rotated partial stacks $l_5$ and $l_5$ which are then transferred to the intermediate storage table in the following stroke of the partial sliding mechanism 134, whereby the rotated partial stacks $b_1$ through $b_4$ are undisturbed and only the already deposited stacks $l_1$ through $l_4$ are pushed over. Next the entire stacking layer S is transferred from the intermediate storage table 70 to the stacking release plate 10 with the aid of pushoff wall 142.

In forming the next stacking layer or tier according to FIG. 7b, a second separating plate 128 is used to produce a separation between the non-rotated partial stacks $l_1$ through $l_5$ and the rotated partial stacks $b_1$ through $b_4$. This separating plate is swung down after the respective leading partial stack $l_1$ through $l_5$ has passed onto the accumulating roller conveyor. FIG. 7b shows the state directly before the completion of the second stacking layer, wherein the last stacking row on the conveyor comprises only a single, non-rotated partial stack l₅, which is then moved along the rotated partial stack when it is transferred by the partial sliding mechanism, and it moves thus along with the previously deposited partial stacks l₁ through l₄. It is seen that when the stacking layers according to FIGS. 7a and 7b are stacked above each other the partial stacks are to a large degree deposited over the gaps, i.e. staggered or in a bond, and thus are mutually braced, since there are no pervasive vertical gaps.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. A process for the mechanical grouping of objects such as books or the like to be stacked into stacking tiers for loading on pallets comprising forming stacks of equal height from individual objects which are supplied flat and with like orientation, conveying a plurality of said stacks along an accumulation stretch for forming a stacking row the length of which corresponds to the transverse dimension of a pallet, rotating at least one of said stacks in said stacking row by 90° with respect to the other stacks in said stacking row during the conveying of the individual stacks, and producing a gap between said at least one of said stacks and the remainder of said stacks in said stacking row, pushing said stacking row onto an intermediate storage table in a direction transverse to its row direction, and completing a first stacking tier having the dimensions of the pallet on the intermediate storage table from a plurality of sequentially arriving of said stacking rows which are pushed on after the first, transferring the thus formed stacking tier from the intermediate storage table to a pallet, and rotating the stacks in succeeding stacking tiers in a different sequence relative to the preceding stacking tier whereby the stacks in succeeding stacking tiers deposited on the pallet are at least partially staggered or overlapping in a bond.

2. A process according to claim 1 and including transferring at least the second and succeeding stacking tiers from the intermediate storage table to a stacking release plate which is adjustable as to height over the pallet, and pulling said plate away from under the stacking tier which lies pressed against a substantially vertical side contact surface.

3. A process according to claim 1 or 2 and including pushing fewer stacking rows onto the intermediate storage table than are necessary to form a stacking tier, and emptying the intermediate storage table toward the pallet or stacking release plate as often as is necessary to form a stacking tier corresponding to the shape and dimensions of the pallet.

4. An apparatus for grouping and stacking objects received from preceding processing stages such as books, book blocks or the like, into stacking layers for loading pallets and including a longitudinal transport mechanism (80) associated with a stacking station (82) for stacks (P) of equal height which are to be formed periodically from objects which are aligned with each other, a mechanism (92) for selectively rotating a stack by 90°, an accumulating roller conveyor (122) with detents (128) movable in the conveying path for forming a stacking row (R) from longitudinally and transversely oriented stacks, a partial pushing mechanism (134) for moving each stacking row sideways onto a region of an intermediate storage table (70) adjacent to said accumulating roller conveyor (122) and positioned ahead of one of the transportable pallet or stacking release plates (10) which are of equal height, a pushoff wall (142) for transferring one or more stacking rows or a completed stacking layer (S) from the intermediate storage table (70) to the pallet or stacking release plate (10) and a programmed control mechanism for activating the stack-rotating mechanism (92), such that the stacks (P) in stacking layers (S) which are successively deposited over each other on a pallet are staggered or overlapping.

5. An apparatus according to claim 4 and including a mechanism (116 and 118) ahead of the stacking station (82) in the region of the longitudinal transport mechanism (80), for selectively rotating individually conveyed books (B) by 90° to either side, so that the books within each stack (P) lie alternately rotated at 180° to each other.

6. An apparatus according to claim 4 and wherein said longitudinal transport mechanism (80) includes multiple parallel conveyor belts, and said book rotating mechanism includes vertical detent rods (116 and 118) which are selectively movable between the conveyor belts in the transport path, whereby the object or stack comes up against said rods off-center and is further conveyed to guide panels (120) for completion of the given rotation.

7. An apparatus according to claim 4 and wherein said stack-rotating mechanism (92) includes a turntable (96) disposed between conveyor belts or conveyor rollers, said turntable being mounted on a driven sliding carriage (94) guided in the transport direction, and said turntable, during the duration of its longitudinal and rotational movement, being lifted up away from the transport level and against a detent disc (112) located at a distance above said transport level and rotatably mounted on a bracket (110) attached to the sliding carriage, said lifting being carried out to hold under compression the book or stack which is to be rotated, and to hold it above the transport level.

8. An apparatus according to claim 7, and including a pinion (98) mounted on the shaft of the turntable (96) engageable with a drive wheel (100) having an eccentric pin (102) guided selectively with respect to the motion of the sliding carriage by means of a switchable routing device (106) and fixed guideways, so that the drive wheel and turntable are caused to rotate to the left or to the right by 90°.

9. An apparatus according to claim 4 and including detents (128) positioned on the side of the accumulating roller conveyor (122) for acting as separation-maintainers between neighboring stacks (P) in a stacking row (D), and are moved-in by the programmed control mechanism in response to the stacks which are differently rotated in the conveying path, said detents having adjustable along the accumulating roller conveyor in their respective separation-maintaining positions.

10. An apparatus according to claim 9 and wherein said detents comprises an obstacle finger movable forward into the conveying path of the stack by means of a pneumatic cylinder, said pneumatic cylinder being adjustable on a guide rail located on the side near the accumulating roller conveyor.

11. An apparatus according to claim 9 and wherein each of said detents comprises a swingable separating plate (128) swingable into the conveying path of the stack, said plate being pivoted on a rail (126) positioned on the side near the accumulating roller conveyor, said plate further being movable longitudinally and being pneumatically driven in its swinging motion.

12. An apparatus according to claim 11 and wherein said pushing wall (134 and 138) of the partial pushing mechanism includes a plurality of upwardly open vertical slots (136 and 140), whereby said separating plates (128) are set above certain of these slots along the accumulating roller conveyor and are guided in them in the actuated, swung-in state during the movement of the pushing wall.

13. An apparatus according to claim 4 and wherein said partial pushing device comprises a vertical pushing wall (134 and 138) extending over the accumulating stretch of the accumulating roller conveyor (122) and over the height of the stacking row standing on said conveyor, whereby said pushing wall is pushed transversely to the accumulating roller conveyor in the direction of the intermediate storage table (70), following the completion of a stacking row or tier.

14. An apparatus according to claim 4 and wherein said pushoff wall (142) travels above the intermediate storage table (70) to the accumulating roller conveyor (122) and is retained and height-adjustable at both of its ends by means of vertical pneumatic cylinders (146 and 148) attached to a sliding carriage (150) underneath the intermediate storage table, said carriage being guided in the same direction as the partial pushing mechanism and driven by a horizontal advancing cylinder (152).

15. An apparatus according to claim 14 and wherein said pushoff wall (142) is connected to the piston rods of pneumatic cylinders (146 and 148) positioned on both sides, by means of swing axles (158 and 160) extending perpendicular to the plane of the extent of said wall, whereby said connection provides play in the plane of said wall and permits tipping the pushoff wall without bending the piston rods.

16. An apparatus according to claim 4 and wherein said detents (128) are positioned above said accumulating roller conveyor (122), and including an intermediate storage table (70) on each side of the accumulating roller conveyor, each of said intermediate storage tables having a pushoff wall (142); and said partial pushing mechanism being controlled and driven alternately from one to the other side of the accumulating roller conveyor for transferring stacking rows to the respective intermediate storage table.

17. An apparatus according to claim 16 and wherein said stacking release plate (10) is guided between the side walls (26) of the lifting frame by upper and lower rollers (21 and 22), whereby the reinforced opposing side walls (26) have upper and lower roller pairs (28 and 30, respectively), by means of which the lifting frame is guided on vertical guide rails (42) of the traveling frame (40).

18. An apparatus according to claim 17 and wherein said lower roller pair (30) of the lifting frame (20) lies against vertical guide rails (42), while the rollers (28 and 29) of the upper roller pair are separated from each other such that the lifting frame may be tipped by the weight shift of the stacking release plate (10), said shift being in the direction of said sideways motion.

19. An apparatus according to claim 17 and wherein said rear upper rollers (29) are spaced from the guide rail for determining the plate (10), and the front upper rollers (28) are pivoted on the end (32) of a two-armed angle lever (31) tensioned against the vertical guide rail (42) by a pneumatic cylinder (34), and for stabilizing the tilting until the stacking release plate is withdrawn from the stack.

20. An apparatus according to claim 17 and including a microswitch (52) on the lifting frame (20) for disconnecting the lifting motor (50) which drives the lifting frame, said disconnection occurring when said frame is being lowered, whereby a switching motion is transmitted to said microswitch when the tilted stacking release plate is placed on the pallet or on a partial stack at the beginning of the swinging motion (20), so that the lowering motion is stopped as soon as the stacking release plate is lying on the partial stack with approximately its front third extent.

21. An apparatus according to claim 4 and wherein said stacking release plate (10) is translatable to the side in a lifting frame (20) movable lengthwise over a conveying distance (60) between a loading station and at least one stacking station formed by a pallet located on the side, next to the longitudinal conveying stretch, said movement being performed by means of a traveling frame (40) vertically movable and tiltable around a slight angle so that said stacking release plate is placed with its free end on the pallet or on a partial stack when said plate is being retracted under the pushing contact surface (38), said retraction being performed by means of a drive mechanism.

* * * * *